(12) United States Patent
Smith

(10) Patent No.: US 6,694,744 B1
(45) Date of Patent: Feb. 24, 2004

(54) FUEL GAS MOISTURIZATION SYSTEM LEVEL CONTROL

(75) Inventor: Raub Warfield Smith, Ballston Lake, NY (US)

(73) Assignee: General Electric Company, Schenectady, NY (US)

(*) Notice: Subject to any disclaimer, the term of this patent is extended or adjusted under 35 U.S.C. 154(b) by 489 days.

(21) Appl. No.: 09/710,973

(22) Filed: Nov. 9, 2000

(51) Int. Cl.[7] .............................. F02C 3/30
(52) U.S. Cl. ............ 60/775; 60/39.53; 60/39.182; 48/127.9
(58) Field of Search ............... 60/39.53, 775, 60/39.461, 39.465, 39.182; 48/127.3, 127.9; 137/389, 101.25

(56) References Cited

U.S. PATENT DOCUMENTS

| | | | |
|---|---|---|---|
| 4,369,803 A | | 1/1983 | Furr |
| 5,295,351 A | * | 3/1994 | Rathbone ................ 60/775 |
| 5,469,707 A | | 11/1995 | Dadachanji |
| 6,357,218 B1 | * | 3/2002 | Ranasinghe et al. .......... 60/775 |
| 6,370,880 B1 | * | 4/2002 | Smith et al. ................ 60/775 |
| 6,389,794 B2 | * | 5/2002 | Ranasinghe et al. .......... 60/775 |
| 6,490,866 B1 | * | 12/2002 | Cummings ................ 60/775 |
| 6,502,402 B1 | * | 1/2003 | Smith et al. ................ 60/775 |

FOREIGN PATENT DOCUMENTS

EP 1065347 1/2001

* cited by examiner

Primary Examiner—Charles G. Freay
(74) Attorney, Agent, or Firm—Nixon & Vanderhye

(57) ABSTRACT

The composition of moisturized fuel gas exiting a fuel gas saturator is controlled using feed forward control. The level of the water is manipulated by adjusting the valve that controls the make-up water. The level controller uses the moisture content of moisturized fuel gas, the flow rate of the dry fuel gas entering the fuel gas saturator, the level of the water at the bottom of the fuel gas saturator and the flow rate of the make-up water to control the valve. Moisture content of the moisturized fuel gas and the flow rate of the dry gas entering the fuel gas saturator are used to calculate the flow rate of water leaving with the moisturized fuel gas. Error is minimized in determination of the flow rate of water leaving with the moisturized fuel gas, thereby allowing tighter control over the process unit.

15 Claims, 4 Drawing Sheets

FUEL GAS MOISTURIZATION SYSTEM LEVEL CONTROL

BACKGROUND OF THE INVENTION

The present invention relates to a fuel gas supply system for a gas turbine and, in particular, to a system for controlling water level in a fuel gas saturator enabling a stable supply of a moisturized fuel gas to a gas turbine during all steady state and transient operating conditions of the fuel gas moisturization system.

Generally, a combined cycle power plant includes a gas turbine, a steam turbine, a heat recovery generator, a fuel superheater and a fuel gas saturator. Dry cold fuel gas is supplied to the fuel gas saturator, where the fuel gas is moisturized. The saturated fuel gas is then heated by the fuel superheater and is supplied to the gas turbine for combustion. The combustion reaction drives the turbine and a generator coupled to the gas turbine to produce electricity. The exhaust from the gas turbine enters a heat recovery generator (HRSG), which utilizes the heat from the exhaust gases to generate steam for use in the steam turbine and heats water for use in the fuel gas saturator and the fuel gas superheater. The steam generated in the heat recovery generator expands in the steam turbine, driving a generator for producing electricity. The water used in the fuel gas saturator requires heating because the fuel gas saturation process heats the gas as water is entrained in the fuel gas, the heat being provided by the exhaust gases from the gas turbine via heated saturation water.

Chemical process and Integrated Gasification Combined Cycle (IGCC) applications with saturators typically run at steady state load for long periods of time. The saturator column utilized by these processes and applications employ a fairly simple control based on constant water recirculation flow and single element closed loop level control via modulation of water make-up to drive the level signal error to zero. In this case, the level signal error equals the difference between the level setpoint and the measured water level. The controller increases or decreases the flow of water make-up based on the level signal error by opening or closing a valve in the water make-up stream. This type of control has been fully satisfactory for an IGCC that employs a diffusion combustor tolerant of variation in fuel supply heating value and temperature.

More demanding level control applications, such as boiler drum water level, add anticipatory control based on measurement of the flow entering and leaving the vessel to develop a feed forward signal to the water supply control valve. These are typically termed three element level controls, because water inlet flow, water outlet flow, and water level in the vessel are directly measured. An algorithm using those measurements is used to control the water supply.

Moisturized fuel supply to a Dry Low $NO_x$ gas turbine combustion system requires extremely tight control on the fuel saturation process. Natural gas fired combined cycles with Dry Low $NO_x$ (DLN) combustion systems impose strict requirements on the fuel saturation process due to tight fuel specification tolerances (variables such as heating value and temperature), frequent and rapid load changes and the absence of a backup fuel (which, if available, could be used to narrow the operating range required of the saturation system). Typically these DLN systems have at least two operating modes: one provides robust performance from initial ignition through early loading and the other provides optimized performance at base or high load. Minimizing system emissions is critical during operation at high load. Accordingly, operation of a finely tuned system for optimal performance at high load, i.e., at or near operating capacity, typically requires a low tolerance for variations in the fuel supply conditions.

A conventional three element level control applied to a fuel gas saturation column, as employed in a typical fuel gas moisturization system, requires measurement of the inlet fuel gas flow, make-up water flow, and exiting moisturized fuel gas flow. This is problematic since the make-up water flow rate is small in relation to the moisturized fuel gas flow rate, such that a small percentage error in the moisturized fuel gas flow rate measurement corresponds to a much larger percentage error in moisturized fuel gas moisture content.

BRIEF SUMMARY OF THE INVENTION

In a preferred embodiment of this invention, three element level control of the water level in the sump of a fuel gas saturator column is provided without direct flow measurement of the moisturized fuel gas. In addition to improving the responsiveness of the level control relative to the responsiveness of a single element level controller, the present invention improves accuracy and reduces cost in relation to a conventional three element level control system that depends on direct measurement of the moisturized fuel gas flow rate.

Particularly, the present invention utilizes a relationship between the moisture content of the exiting fuel gas and measured inlet dry fuel gas flow rate to calculate a more accurate flow rate of water exiting with the moisturized gas. The moisture content of the moisturized fuel gas is calculated from measurements of moisturized fuel gas temperature (wet-and dry-bulb temperatures) and moisturized fuel gas pressure exiting the fuel gas saturator. The level of the water in the bottom of the saturation column is controlled using the more accurate, calculated flow rate of water exiting with the saturated fuel gas, the water inlet flow rate, and the level of water in the tank. Using these parameters, the controller adjusts the flow rate of the make-up water to ensure a stable level of water in the sump of the fuel gas saturator.

In another preferred embodiment, the saturated fuel gas moisture content is measured directly. The measurement is effected by using a humidity sensor or more precise composition measurement, such as gas chromatography. The measured saturated fuel gas moisture content is then used to calculate water outlet flow rate in combination with the measured dry fuel flow. The water outlet flow rate is used with measurements of water inlet flow rate and water level in the column sump to control the water level in the column sump.

In a preferred embodiment according to the present invention, there is provided a method for controlling the level of water in a fuel gas saturator sump comprising the steps of determining a proportion of the water in the moisturized fuel gas supplied by the gas saturator, determining the flow rate of dry fuel gas entering the gas saturator, calculating the flow rate of water in the moisturized fuel gas supplied by the gas saturator (without direct flow measurement of the moisturized fuel gas) and adjusting the flow of make-up water entering the fuel gas saturator in accordance with the determined flow rate of the water portion in the moisturized gas exiting the gas saturator to control the level of water in the fuel gas saturator thereby to maintain a stable level of water in the fuel gas saturator throughout all steady state and transient operating conditions.

In a further preferred embodiment according to the present invention, there is provided in a combined cycle system having a gas turbine and a steam turbine for generating electricity, a heat recovery system generator for recovering heat from the exhaust gases of the gas turbine and generating steam for use in the steam turbine and a fuel gas saturator for supplying moisturized fuel gas in the gas turbine, a method of controlling the level of water in the fuel gas saturator comprising the steps of determining a proportion of water in the moisturized fuel gas provided by the gas saturator and providing a first signal in response thereto, determining a flow rate of dry fuel gas entering the gas saturator and providing a second signal in response thereto, calculating a flow rate of water contained in the moisturized fuel gas provided by the gas saturator using the first and second signals and without direct flow measurement of the moisturized fuel gas and adjusting a flow of make-up water entering the fuel gas saturator in accordance with the calculated flow rate of the water contained in the moisturized gas exiting the gas saturator to control the level of the water in the fuel gas saturator, thereby to maintain a stable level of water in the fuel gas saturator throughout all steady state and transient operating conditions.

In a still further preferred embodiment according to the present invention, there is provided an apparatus for controlling the level of water in a fuel gas saturator sump comprising means for determining a proportion of water in the moisturized fuel gas supplied by the gas saturator without direct flow measurement of the moisturized fuel gas and providing a first signal in response thereto, a sensor for measuring a flow rate of a dry fuel gas entering the fuel gas saturator and providing a second signal in response thereto, means for determining a flow rate of water in the moisturized gas provided by the fuel gas saturator from the first and second signals and without direct flow measurement of the moisturized fuel gas and a controller for controlling the flow of make-up water entering the fuel gas saturator in accordance with the determined flow rate of water in the moisturized fuel gas supplied by the gas saturator, thereby controlling the level of the water in the fuel gas saturator.

DETAILED DESCRIPTION OF THE INVENTION

Figure 1:
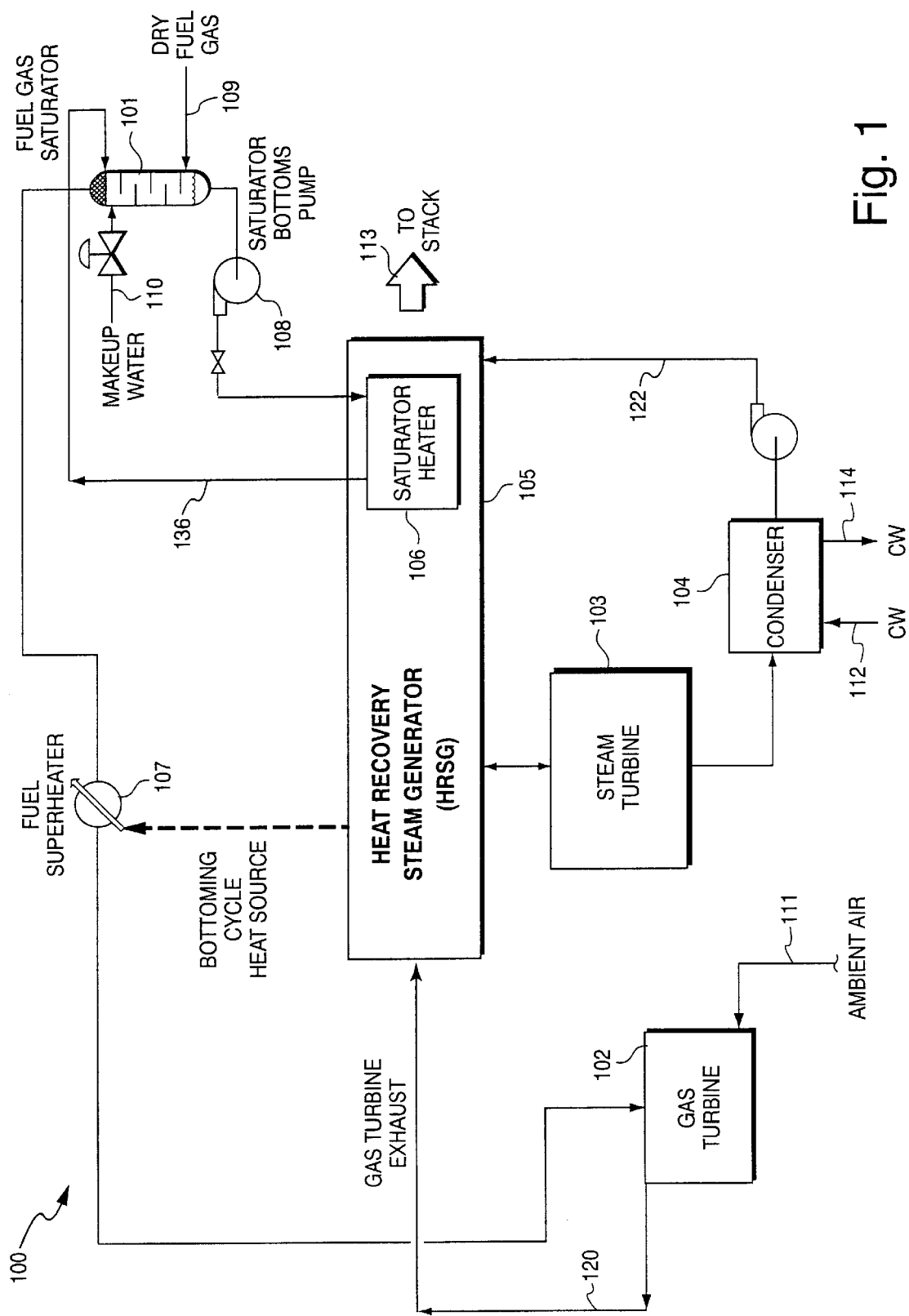
FIG. 1 is a schematic representation of a natural gas fired combined cycle power plant in which a fuel gas moisturization system level control of the present invention is utilized.

A schematic of a natural gas fired combined cycle power plant containing a modified bottoming cycle for fuel gas moisturization is shown in FIG. 1. This schematic is used as an example, and the present invention is not intended to be limited solely to usage in this type of power plant. Also, the type of power plant depicted in FIG. 1 is more fully described in U.S. application Ser. No. 09/340,510, filed Jul. 1, 1999, of common assignee herewith.

A natural gas fueled combined cycle power plant, generally designated 100, includes a fuel gas saturator 101, a gas turbine 102, a steam turbine 103, a condenser 104, a heat recovery steam generator (HRSG) 105, a saturator heater 106, a fuel superheater 107, and a saturator bottoms pump 108. The chemical process inputs include dry fuel gas supplied to the saturator 101 via conduit 109, make-up water supplied to the fuel saturator 101 via conduit 110, an ambient air stream, indicated 111, and a cooling water stream 112. The chemical process outputs are stack gas indicated by the arrow 113 and a spent water stream 114. Electric energy generated by one or more generators (not shown) coupled to the gas and steam turbines is, of course, also a process output.

As illustrated in FIG. 1, dry fuel gas supplied via conduit 109. is bubbled through fuel gas saturator 101, which is a packed or trayed column, moisturizing the fuel gas with water. The moisturized fuel gas exits the top of the saturator and is superheated using a bottoming cycle heat source in a fuel superheater 107. From the fuel superheater 107, the superheated moisturized fuel enters the gas turbine 102 for combustion. The hot gases of the gas turbine exhaust flow to HRSG 105 via conduit 120. HRSG 105 comprises a centralized heat exchanger having multiple units for recovering heat from the exhaust gases of the gas turbine 102. The exhaust gases exit the HRSG 105 to the stack 113. Heat recovered from the exhaust of the gas turbine 102 is used to generate steam, which is used by steam turbine 103. The gas turbine 102 and the steam turbine 103 drive one or more generators, not shown, for generating electricity. The effluents from the steam turbines are condensed in condenser 104 using cooling water 112 and returned to the HRSG 105 via conduit 122.

Water leaving the bottom of the fuel gas saturator 101 through saturator bottoms pump 108 enters the HRSG 105 and recovers heat from the gas turbine exhaust in saturator heater 106. The heated water is returned to the fuel gas saturator 101 for moisturizing the dry fuel gas via conduit 136. Makeup water is supplied the fuel gas saturator water via conduit 110 to replace the water exiting with the moisturized fuel gas.

Figure 2:
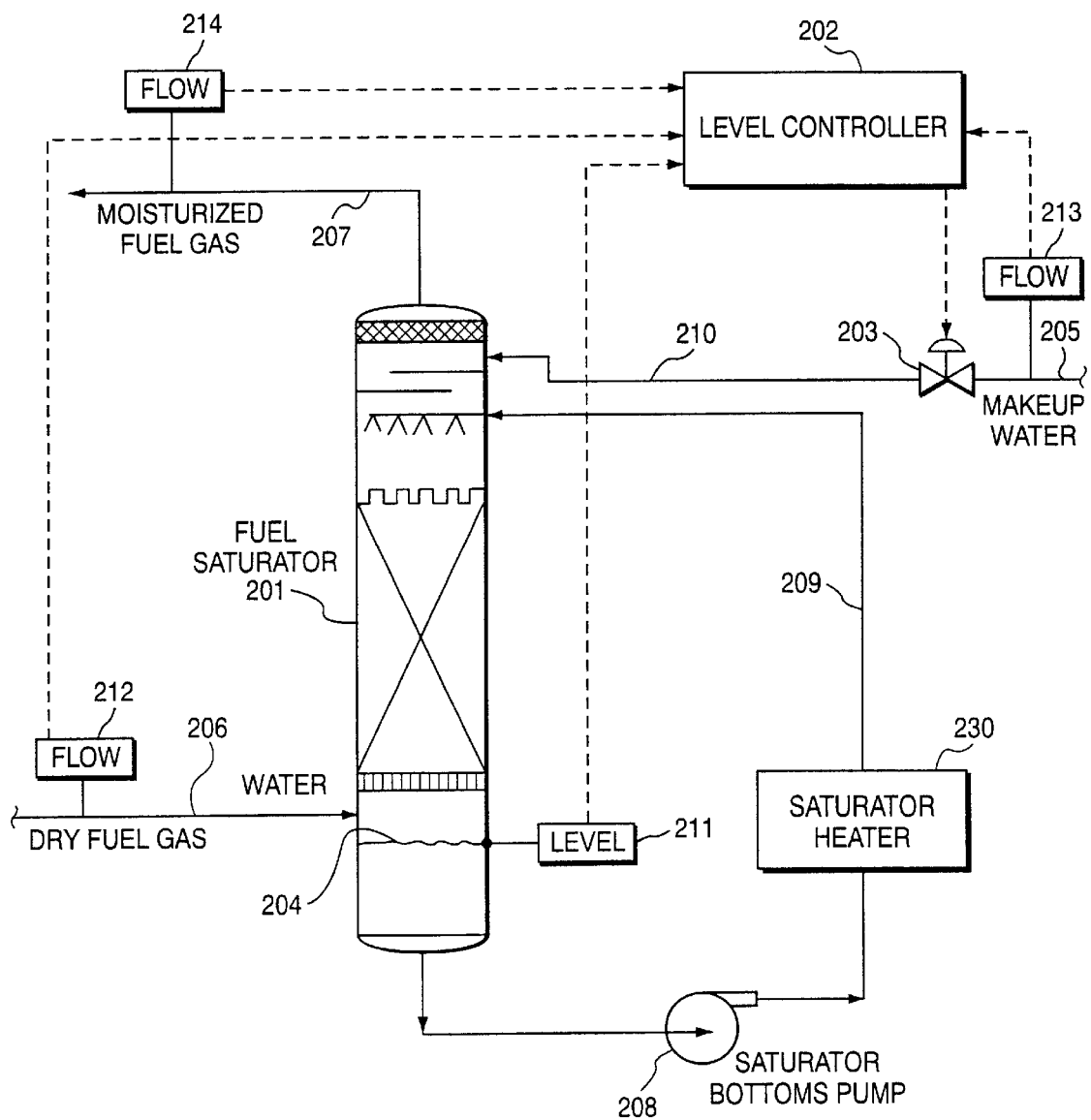
FIG. 2 is a schematic representation of a prior art control for level control in a conventional fuel gas saturator.

A schematic representation of a conventional three-element level control for a fuel gas saturator is illustrated in FIG. 2. As illustrated, the level of water in fuel gas saturator column 201 is controlled by level controller 202. Level controller 202 adjusts valve 203 to increase or decrease the supply of make-up water to column 201 via conduit 210, causing the water level 204 to rise or fall accordingly. Valve 203 changes the flow rate of make-up water in make-up supply water conduit 205. Conduit 209 returns heated water which is pumped from the bottom of the saturator 201 by saturator bottoms pump 208 via saturator heater 230. Conduits 209 and 210 communicate with the top of the fuel gas saturator column 201 to moisturize the dry fuel gas. Dry fuel gas supplied via conduit 206 enters the fuel gas saturator 201, contacts water within the column and provided via conduits 209 and 210, and exits the column as a moisturized fuel gas via conduit 207. Dry fuel gas in conduit 206 has a negligible moisture content; whereas, the moisturized fuel gas in conduit 207 has a non-negligible percentage of moisture (>5%).

Level controller 202 variably adjusts valve 203 using feed forward control as a function of certain measurements. Thus, level sensor 211 measures the water level 204 in saturator 201. Flow rate sensor 212 measures the flow rate of dry fuel gas in conduit 206 flowing into the saturator 201, and flow rate sensor 213 measures the flow rate of make-up water in conduit 205 flowing into saturator 201. Flow rate sensor 214 measures the flow rate of moisturized fuel gas in conduit 207. The measured flow rate of dry fuel gas in conduit 206 is subtracted from the measured flow rate of moisturized fuel gas in conduit 207 to determine the flow rate of water leaving the saturator mixed with the moisturized fuel gas in conduit 207. This is shown by EQUATION 1:

Water Component of the Outlet Flow=Wet Outlet Fuel Flow−Dry Inlet Fuel Flow

The level controller 202 combines this calculated number with the level of water measured by level sensor 211 and the flow rate of make-up water in stream 205 measured by flow rate sensor 213 to determine the appropriate adjustment to valve 203. This method of subtraction to determine the flow rate of water exiting with moisturized fuel gas in conduit 207 has a large, unavoidable error caused by the magnification of measurement error of the flow rate of moisturized fuel gas in stream 207. Primarily, this error is caused by the approximate equivalence of the flow rate of dry fuel gas and the flow rate of moisturized fuel gas, i.e., fuel moisture in the moisturized stream is small in relation to total flow, such that flow measurement error of the total flow is large in relation to fuel moisture.

Figure 3:
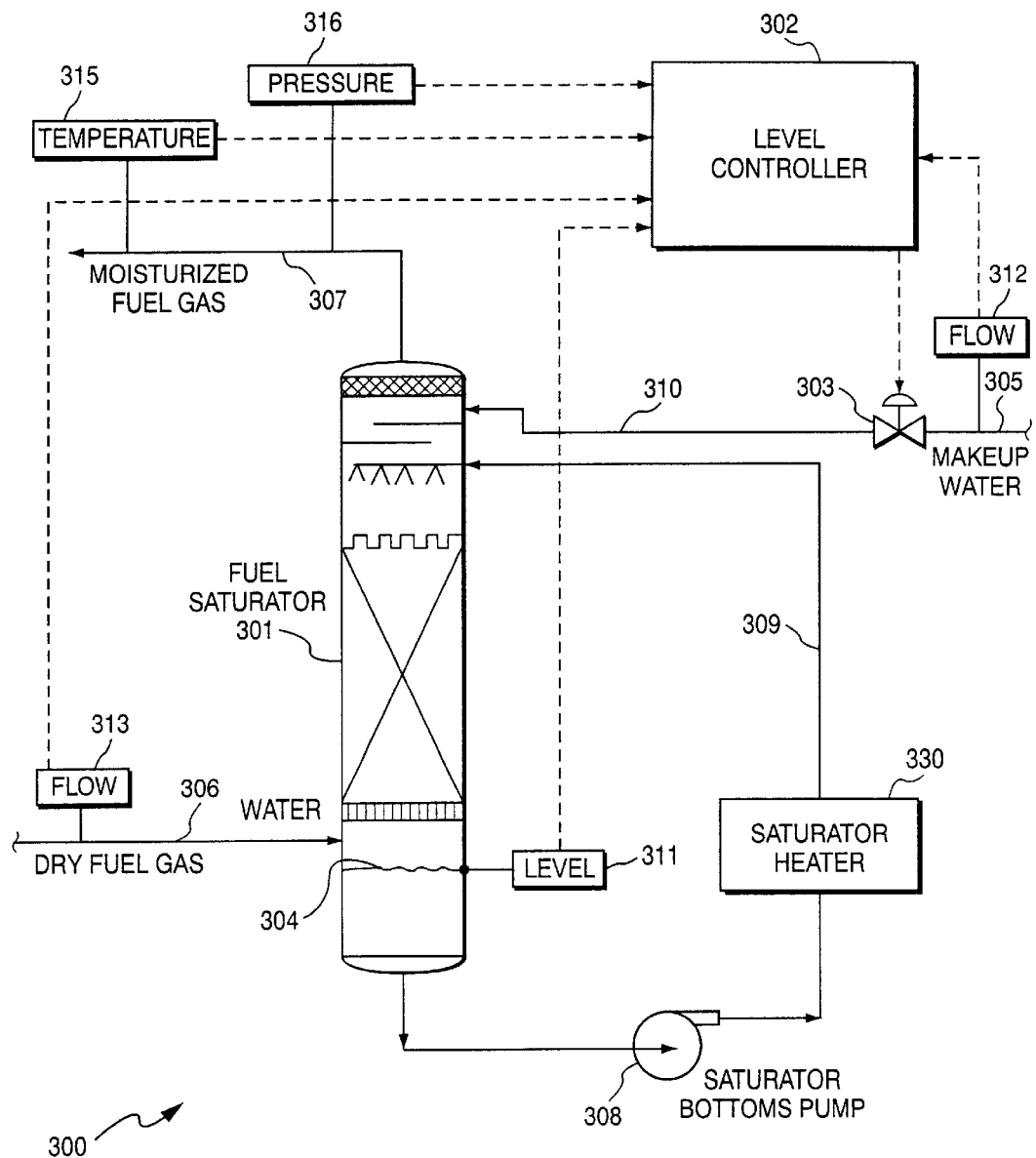
FIG. 3 is a schematic representation of a control for level control in a fuel gas saturator in accordance with a preferred embodiment of the invention.

In a preferred embodiment of the present invention depicted in FIG. 3, wherein like parts are designated by like reference numbers advanced by 100, the fuel gas saturator 301 is similar to the fuel gas saturator of FIG. 2. However, the control system therefor is quite different. In FIG. 3, a temperature sensor 315 and a pressure sensor 316 are employed for measuring the moisturized fuel gas in conduit 307. The proportion or percentage of moisture in the moisturized fuel gas in conduit 307 is a function of temperature and pressure and can be calculated from those parameters. The flow rate of the water component exiting with the moisturized fuel gas from saturator 301 is then calculated, e.g., by multiplying the flow rate of dry inlet fuel gas in conduit 306 by the percentage moisture content of moisturized fuel gas in conduit 307 divided by one minus the percentage moisture content of moisturized fuel gas in conduit 307. This calculation is shown by EQUATION 2:

$$\text{Water Component of the Outlet Flow} = \frac{\text{Dry Inlet Fuel Flow} \times \% \text{ Exit Moisture}}{1 - \% \text{ Exit Moisture}}$$

Once the flow rate of the water component exiting with the moisturized fuel gas in conduit 307 has been determined, the level controller 302 uses an algorithm to adjust the valve 303 in make-up water conduit 205, thereby controlling the level of water 304 at the bottom of the fuel gas saturator 301.

Figure 4:
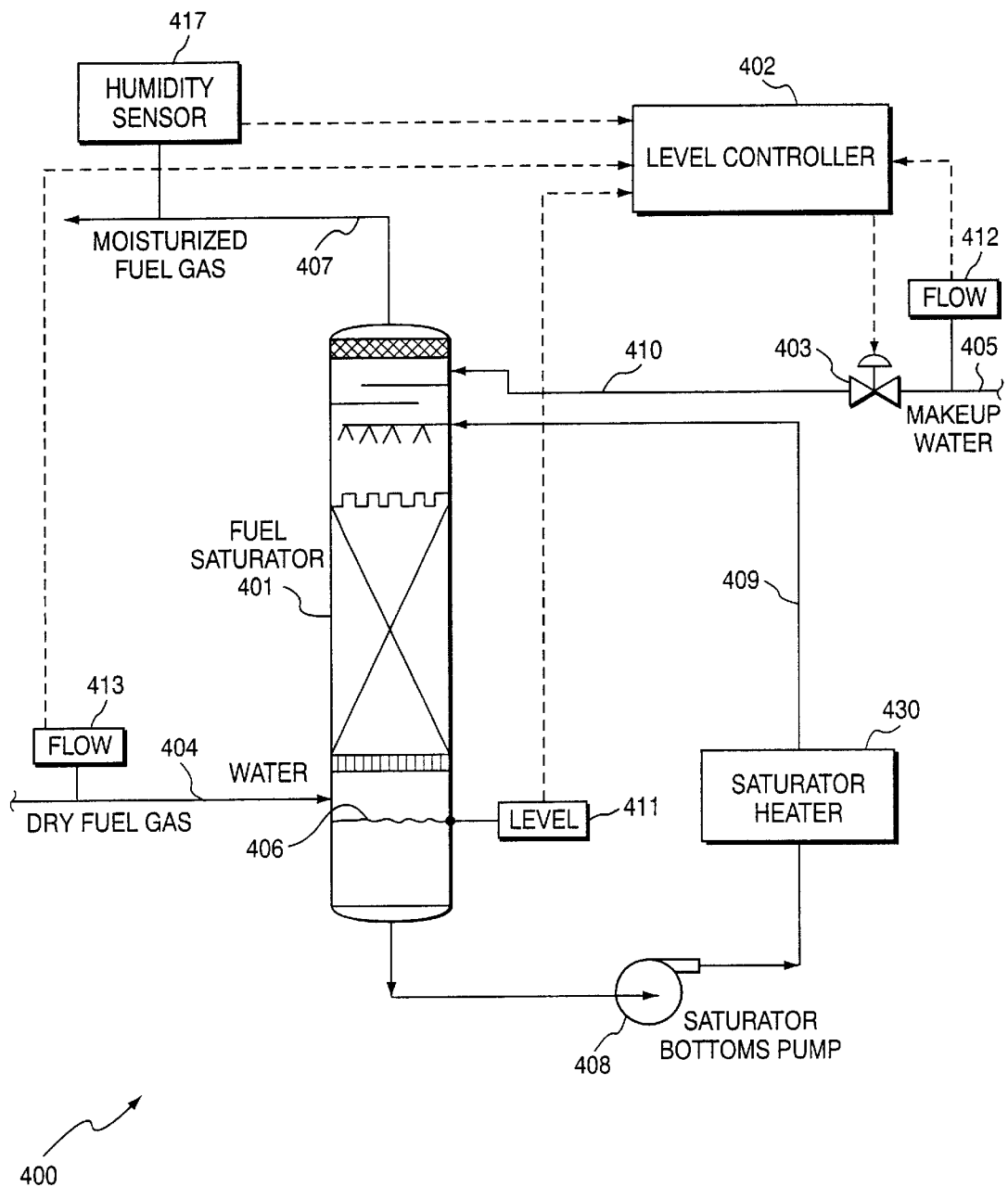
FIG. 4 is a schematic representation of a control for controlling level in a fuel gas saturator in accordance with another preferred embodiment of the present invention.

Another preferred embodiment of a moisturized fuel gas supply system according to the present invention and generally designated 400 is illustrated in FIG. 4. This embodiment is similar to the embodiment depicted in FIG. 3, and like reference numerals are applied to like parts as in the preceding embodiment advanced by 100. Moisture, i.e., humidity, sensor 417 measures the moisture content of the saturated fuel gas in stream 407 directly, thus replacing the temperature sensor 315 and pressure sensor 316 shown in FIG. 3. The amount of water exiting with moisturized fuel gas in stream 407 is calculated in the same manner as in the preferred embodiment described above using EQUATION 2. Level controller 402 uses the calculated amount of water exiting with the moisturized fuel gas in conduit 407, the flow rate of make-up water in conduit 405, and the level 404 of the water to adjust valve 403 appropriately and hence the flow of water into saturator 401 from the combined flows of make-up water via conduit 405 and the recycle water via conduit 409.

While the invention has been described in connection with what is presently considered to be the most practical and preferred embodiment, it is to be understood that the invention is not to be limited to the disclosed embodiment, but on the contrary, is intended to cover various modifications and equivalent arrangements included within the spirit and scope of the appended claims.

What is claimed is:

1. A method for controlling the level of water in a fuel gas saturator comprising the steps of:
    determining a proportion of the water in the moisturized fuel gas supplied by the gas saturator;
    determining a flow rate of dry fuel gas entering the gas saturator;
    determining a flow rate of the portion of water in the moisturized fuel gas supplied by the gas saturator without direct flow measurement of the moisturized fuel gas; and
    adjusting a flow of make-up water entering the fuel gas saturator in accordance with the determined flow rate of the water portion in the moisturized gas exiting the gas saturator to control the level of water in the fuel gas saturator thereby to maintain a stable level of water in the fuel gas saturator throughout all steady state and transient operating conditions.

2. A method according to claim 1 including determining a flow rate of make-up water entering the gas saturator, determining the level of the water in the gas saturator and adjusting the flow of make-up water entering the gas saturator in relation to flow rate of water exiting the gas saturator in the moisturized fuel and the level of the water in the gas saturator in relation to its level setpoint.

3. A method according to claim 1 wherein the step of determining the proportion of water in the moisturized fuel gas exiting the gas saturator includes determining a temperature and pressure of the moisturized fuel gas supplied by the fuel gas saturator.

4. A method according to claim 3 including determining a flow rate of a make-up water entering the gas saturator, determining the level of the water in the gas saturator and adjusting the flow of make-up water entering the gas saturator in relation to the flow rate of water exiting the gas saturator in the moisturized fuel and the level of the water in the gas saturator in relation to its level setpoint.

5. A method according to claim 1 wherein the step of determining the proportion of water in the moisturized fuel gas supplied by the gas saturator includes sensing the humidity of the moisturized fuel gas and providing a signal in response thereto, and controlling the level of water in the saturator in response to said signal.

6. A method according to claim 1 including determining the composition of the moisturized fuel gas to determine the proportion of water in the moisturized fuel gas supplied by the gas saturator.

7. In a combined cycle system having a gas turbine and a steam turbine for generating electricity, a heat recovery steam generator for recovering heat from the exhaust gases of the gas turbine and generating steam for use in the steam turbine and a fuel gas saturator for supplying moisturized fuel gas in the gas turbine, a method of controlling the level of water in the fuel gas saturator comprising the steps of:
    determining a proportion of water in the moisturized fuel gas provided by the gas saturator and providing a first signal in response thereto;
    determining a flow rate of dry fuel gas entering the gas saturator and providing a second signal in response thereto;

calculating a flow rate of the water in the moisturized fuel gas provided by the gas saturator using said first and second signals and without direct flow measurement of the moisturized fuel gas; and adjusting a flow of make-up water entering the fuel gas saturator in accordance with the calculated flow rate of the water in the moisturized gas exiting the gas saturator to control the level of the water in the fuel gas saturator, thereby to maintain a stable level of water in the fuel gas saturator throughout all steady state and transient operating conditions.

8. A method according to claim 7 including determining a flow rate of a make-up water entering the gas saturator, determining the level of the water in the gas saturator and adjusting the flow of make-up water entering the gas saturator in relation to the flow rate of water exiting the gas saturator in the moisturized fuel and the level of the water in the gas saturator in relation to its level setpoint.

9. A method according to claim 7 wherein the step of determining the proportion of water in the moisturized fuel gas exiting the gas saturator includes determining a temperature and pressure of the moisturized fuel gas leaving by the fuel gas saturator.

10. A method according to claim 9 including determining a flow rate of a make-up water entering the gas saturator, determining the level of the water in the gas saturator and adjusting the flow of make-up water entering the gas saturator in relation to the flow rate of water exiting the gas saturator in the moisturized fuel and the level of the water in the gas saturator in relation to its level setpoint.

11. A method according to claim 7 wherein the step of determining the proportion of water in the moisturized fuel gas supplied by the gas saturator includes sensing the humidity of the moisturized fuel gas and providing a signal in response thereto, and controlling the level of water in the saturator in response to said signal.

12. A method according to claim 7 including determining the composition of the moisturized fuel gas to determine the proportion of water in the moisturized fuel gas supplied by the gas saturator.

13. An apparatus for controlling a level of water in a fuel gas saturator sump comprising:

means for determining a proportion of water in the moisturized fuel gas supplied by the gas saturator without direct flow measurement of the moisturized fuel gas and providing a first signal in response thereto;

a sensor for measuring a flow rate of a dry fuel gas entering the fuel gas saturator and providing a second signal in response thereto;

means for determining a flow rate of water in the moisturized gas provided by the fuel gas saturator from said first and second signals and without direct flow measurement of the moisturized fuel gas; and a controller for controlling the flow of make-up water entering the fuel gas saturator in accordance with the determined flow rate of water in the moisturized fuel gas supplied by the gas saturator, thereby controlling the level of the water in the fuel gas saturator.

14. An apparatus according to claim 13 wherein said means for determining the proportion of water in the moisturized fuel gas includes sensors for determining temperature and pressure of the moisturized fuel gas provided by the gas saturator.

15. An apparatus according to claim 13 wherein said means for determining the proportion of water in the moisturized fuel gas provided by the gas saturator includes a sensor for directly measuring the proportion of water in the moisturized fuel gas provided by the gas saturator.

* * * * *